US00RE47554E

(19) United States
(12) Reissued Patent
Rose

(10) Patent Number: US RE47,554 E
(45) Date of Reissued Patent: Aug. 6, 2019

(54) POWER ASSISTED STEERING FOR MOTORIZED PALLET TRUCK

(75) Inventor: Timothy L. Rose, Winterville, NC (US)

(73) Assignee: HYSTER-YALE GROUP INC., Fairview, OR (US)

(21) Appl. No.: 13/363,277

(22) Filed: Jan. 31, 2012

Related U.S. Patent Documents

Reissue of:
(64) Patent No.: 7,661,493
Issued: Feb. 16, 2010
Appl. No.: 11/109,900
Filed: Apr. 19, 2005

(51) Int. Cl.
*B62D 6/00* (2006.01)
*B62D 5/00* (2006.01)
*B62D 1/14* (2006.01)
*B62D 51/04* (2006.01)

(52) U.S. Cl.
CPC ..... *B62D 51/04* (2013.01); *B62D 1/14* (2013.01); *B62D 5/00* (2013.01); *B62D 6/00* (2013.01)

(58) Field of Classification Search
USPC ..... 180/19.1–19.3, 9.22
See application file for complete search history.

(56) References Cited

U.S. PATENT DOCUMENTS

| | | | | |
|---|---|---|---|---|
| 3,946,825 | A | 3/1976 | Gail | |
| 4,287,959 | A * | 9/1981 | Inman | 180/12 |
| 4,287,966 | A * | 9/1981 | Frees | 187/231 |
| 4,336,860 | A * | 6/1982 | Noller et al. | 180/273 |
| 4,409,789 | A | 10/1983 | Hansen et al. | |
| 4,598,797 | A | 7/1986 | Schultz | |
| 4,828,066 | A | 5/1989 | Hayashi | |
| 5,128,598 | A | 7/1992 | Avitan | |
| 5,245,144 | A | 9/1993 | Stammen | |
| 5,293,952 | A | 3/1994 | Ledamoisel et al. | |
| 5,657,524 | A | 8/1997 | Kubala | |
| 5,964,313 | A * | 10/1999 | Guy | 180/332 |
| 6,070,691 | A | 6/2000 | Evans | |
| 6,190,264 | B1 | 2/2001 | Al-Rawi | |
| 6,227,320 | B1 * | 5/2001 | Eggert et al. | 180/19.2 |
| 6,776,249 | B2 | 8/2004 | Fortin | 180/19.3 |
| 6,883,625 | B2 * | 4/2005 | Trego et al. | 180/19.2 |
| 7,017,689 | B2 | 3/2006 | Gilliland et al. | 180/19.1 |
| 7,025,157 | B2 * | 4/2006 | Lindsay et al. | 180/19.2 |

(Continued)

FOREIGN PATENT DOCUMENTS

| | | |
|---|---|---|
| EP | 0900719 | 3/1993 |
| EP | 1475297 | 11/2004 |

(Continued)

OTHER PUBLICATIONS

European Patent Office, "Examination Report" for EP07758173.4, dated Dec. 7, 2012, 4 pages.

(Continued)

*Primary Examiner* — Glenn K Dawson
(74) *Attorney, Agent, or Firm* — Schwabe Williamson & Wyatt

(57) ABSTRACT

A system for controlling the acceleration, deceleration, braking, travel speed, and power assisted steering of a pallet truck, comprising setting a steering system and a traction system performance as a function of a position and rate of change of position of a control arm in a vertical axis and a horizontal axis of rotation.

52 Claims, 5 Drawing Sheets

(56) References Cited

U.S. PATENT DOCUMENTS

| | | | | |
|---|---|---|---|---|
| 7,441,625 | B2 | 10/2008 | Ackerman | |
| 7,661,493 | B2 | 2/2010 | Rose | |
| 7,665,555 | B2 * | 2/2010 | Rose et al. | 180/19.2 |
| 2002/0074179 | A1 * | 6/2002 | Brandt et al. | 180/252 |
| 2003/0029647 | A1 | 2/2003 | Trego et al. | |
| 2003/0079923 | A1 * | 5/2003 | Johnson | 180/19.3 |
| 2005/0016779 | A1 | 1/2005 | Lindsay et al. | |
| 2005/0247508 | A1 | 11/2005 | Gilliland et al. | |
| 2006/0231301 | A1 | 10/2006 | Rose et al. | |

FOREIGN PATENT DOCUMENTS

| | | |
|---|---|---|
| EP | 2532570 | 12/2012 |
| EP | 1877296 | 1/2013 |
| GB | 2404179 | 1/2005 |
| WO | 20040059088 | 7/2004 |
| WO | 2006113510 | 12/2007 |

OTHER PUBLICATIONS

European Patent Office, "Extended Search Report" for EP07758173.4, dated Apr. 26, 2011, 5 pages.
European Patent Office, "Examination Report" for EPO12183343.8, dated Feb. 3, 2014, 6 pages.
European Patent Office, Extended European Search Report, dated Oct. 26, 2012, 8 pages.
Stolowitz Ford Cowger LLP, "Listing of Related Cases", Sep. 14, 2012, 2 pages.
Still GmbH, EGU Technical Data brochure, "Pedestrian Low-Lift Pallet Truck", Mar. 2004, Germany, 16 pages.
"The International Review of Industrial Vehicle Design, Engineering & Components", IVT International 2004, pp. 113-115.

* cited by examiner

POWER ASSISTED STEERING FOR MOTORIZED PALLET TRUCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present invention is directed to a motorized vehicle, such as an industrial pallet truck, that the operator can ride on or walk alongside of. An industrial pallet truck is utilized to lift and transport loads between locations. Loads may be transported from aisles in warehouses, truck trailers, and in retail stores, for example. The conditions for transporting and maneuvering the loads will vary greatly depending on the location and the size of the load. As such, the operator will need to constantly adjust not only the steering of the pallet truck as a whole, but also the angle of the control arm, and the acceleration, deceleration, travel speed and direction of the motorized vehicle. Maneuvering the pallet truck requires careful attention of the operator, and typical operation involves guiding the pallet truck in a wide variety of stacking and steering maneuvers, which requires significant operator expertise to avoid obstacles, position a load, and turn in narrow confines. Further, the steering effort to maneuver the motorized pallet truck is dependent upon the angle of the control arm, the steering angle, and the load carried by the vehicle. As an example, the steering effort for a typical motorized pallet truck carrying a capacity load of 8,000 pounds can exceed 100 pounds.

Typical pallet truck steering systems and direction/speed control systems regulate the acceleration, deceleration, braking, and travel speeds of the motorized vehicle as a function of the vertical position of the control arm. Most steer systems utilize a simple on/off switch to detect the steering tongue position either in the brake "on" or "off" positions, where an approximate vertical position and approximate horizontal position of the control arm are considered the braking positions, or brake "on" position. Control arm positions intermediate the approximate vertical and approximate horizontal positions are considered the non-braking position, or brake "off" position, and allow for vehicle acceleration.

Some pallet truck steering systems provide that as the control arm approaches the vertical and horizontal positions, the level of performance of the traction system is reduced to a lower value so as to avoid abrupt changes in travel speed. These systems recognize that when the control arm is in a near vertical position that the operator is likely maneuvering the pallet truck in a narrow confine, and requires more sensitive control for steering and acceleration. By causing a reduction in the overall level of performance of the traction system, the operator is able to control the speed and steering of the truck in finer increments while using the same throttle control as at normal travel speeds. A dead-man switch such as those known in the state of the art, disables the traction system when the control arm is moved to either the vertical or horizontal position.

With the control arm moved from the vertical position, the pallet truck will move in a forward or reverse direction according to the direction control sent by the throttle. With the control arm located in a central position, along the axis of the pallet truck centerline, the pallet truck is in its most stable configuration, and the truck may be accelerated at the maximum value. However, as the control arm is turned towards the left or right steering positions, lateral stability of the pallet truck becomes increasingly compromised the further the control arm is turned towards the extreme left and right steering positions. At the extreme left and right positions, the control arm is positioned nearly perpendicular to the centerline axis of the pallet truck that lies parallel with the forks, and therefore provides the smallest turning radius possible. In this condition, the pallet truck is least stable from a lateral perspective, and sudden, rapid increases to the output of the traction system can cause the pallet truck to pivot onto the side of the frame, and potential damage the pallet truck, the floor, or the load. Inappropriate levels of acceleration might be the result of improper techniques from less experience operators, or for maneuvers involving large loads, for example.

Typical pallet trucks utilize a control arm that is manually operated, however this can result in a manual effort by the operator of as much as 100 lb of force to turn the control arm when a heavy load is being transported, contributing to unwanted operator fatigue. Power assisted steering systems used in some industrial vehicles attempt to overcome this problem by detecting a threshold torque applied by the operator on the steer device, and then provide assisted power steering by means of an auxiliary steer motor or hydraulic device.

It is desirable to control the level of performance of the traction system and power assist steering system not only as a function of the control arm angle from a vertical to horizontal position, but also as a function of steering position from left to right. It is also desirable to measure the rate of change of the position of the control arm, such that the acceleration, deceleration, braking, travel speed, and power assisted steering may be modulated according to the operator's command. The present invention addresses these and other problems associated with the prior art.

SUMMARY OF THE INVENTION

The present invention provides for an improved method and system to control the steering and traction systems of a motorized vehicle such as an industrial pallet truck. The improved method relates to controllability of the acceleration, deceleration, braking, travel speed, and power assisted steering of a motorized vehicle as it relates to the position of a control arm, and rate of change of position of the control arm, in both the vertical and horizontal directions. By providing a power assisted steering system and controlling the level of performance of the traction system in this way, operation of the pallet truck can be made more responsive to the operator commands.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
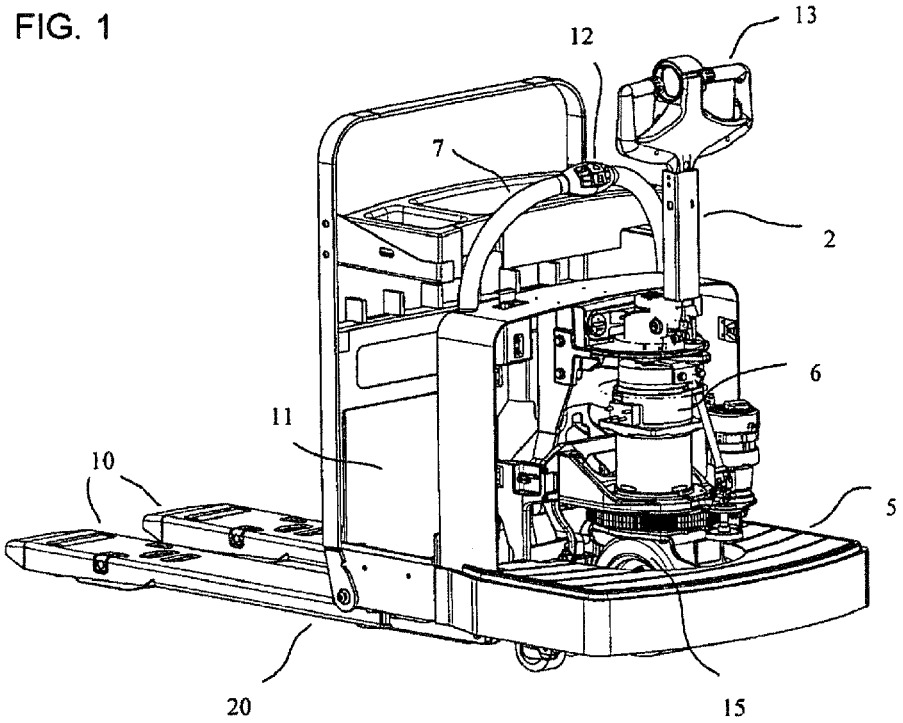
FIG. 1 is a perspective view of a typical pallet truck in which the present invention may be made operable.
Figure 8:
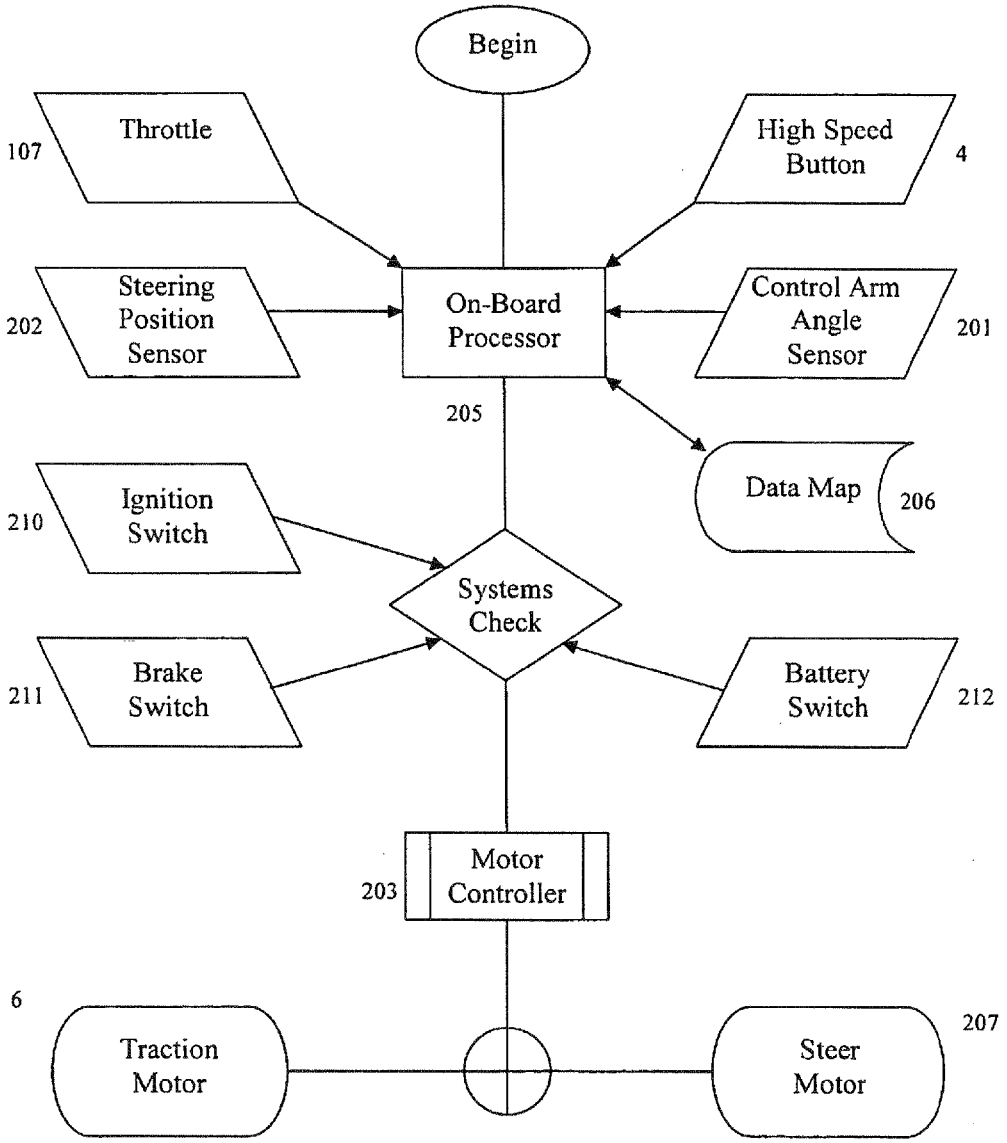
FIG. 8 is a state diagram of the on-board processor and method of determining vehicle acceleration, deceleration, braking, travel speed, and steering control.

A detailed description of the invention will now be provided, making reference to the enumerated drawings. FIG. 1 shows a typical pallet truck 20 which may be used with the present invention. The pallet truck 20 includes an operator platform 5, by which the operator (not shown) may stand on the pallet truck 20 during low or high speed travel. From the operator platform 5, the operator is able to reach the support bar 7 and steer control handle 13. The support bar 7 has at its center point a control panel 12 that operates the high speed of the pallet truck 20 and position of the forks 10 and includes a high speed button 4 (FIG. 8). The steer control handle 13 includes two symmetrical throttles 107 (FIG. 2) and two symmetrical pick buttons 108 (FIG. 2), located on either side of the steer control handle 13. The pallet truck 20 is powered by a traction motor 6 which is energized by a battery 111 (FIG. 8) located in the battery compartment 11. The steer control handle 13 controls the direction of the drive wheel 15 which is located directly under the traction motor 6, and controls the direction of travel of the pallet truck 20.

When the operator is on the operator platform 5 or is walking alongside of the pallet truck 20, the operator may activate the throttle 107 with the same hand that is holding and controlling the steer control handle 13. Activation of the throttle 107 will cause the traction motor 6 to move in the forward or reverse direction in a low speed travel mode depending on the command sent by the throttle 107 to the traction motor 6. In the example pallet truck 20 shown in FIG. 1, the throttle 107 is a butterfly type design which may be rotated forward, away from the operator, to cause the pallet truck 20 to move in the reverse direction, or may be rotated backward, towards the operator, to cause the pallet truck 20 to move in the forward direction, similar to a conventional motorcycle throttle. Other types of throttle may be used on different embodiments of the present invention, such as twist grips, buttons, toggles, and pedals, without affecting the function or scope of the invention.

The pallet truck 20 may operate in either low speed travel mode, or high speed travel mode. When the pallet truck 20 is first turned on, the pallet truck 20 is in the low speed travel mode. The pallet truck 20 will only enter high speed travel mode if the operator simultaneously or sequentially activates the throttle 107 and presses a high speed button 4 (FIG. 8).

With the throttle 107 positioned in the forward or reverse direction, the operator may simultaneously or sequentially press the high speed button 4 to activate the high speed travel mode. The operator may then continue to activate the throttle 107 in this high speed mode, whereby the pallet truck 20 is able to travel at a higher maximum speed, for example when the operator needs to move a greater distance between picking loads, than compared to the low speed travel mode. If the throttle 107 is released or placed in a neutral position, the pallet truck 20 will coast to a stop. Subsequent activation of the throttle 107 will cause the pallet truck 20 to travel in the low speed range until and unless the high speed button 4 is again activated.

Variable acceleration, braking, travel speed, and steering control as defined by the position of the control arm 2 can be defined differently for high speed travel than for low speed travel. In one embodiment of the invention, high speed travel would only be possible with the control arm 2 in a center steering range between left and right, and the center range between vertical and horizontal braking conditions. In another embodiment, acceleration and travel speeds would be made to vary similar to the low speed travel modes when the control arm 2 lies in a range adjacent to the vertical or horizontal positions. Because of the inherent instability with the control arm 2 located in the extreme left and right steer positions, in the preferred embodiment it is desirable that the high speed button 4 will not be functional in this condition, and that the pallet truck 20 would instead operate only under the conditions of the low speed travel mode.

The preferred embodiment of this invention provides for a control arm angle sensor 201 (FIG. 3) and a steering angle sensor 202 (FIG. 3), which determine the angle of control arm 2 both in the vertical (up and down) and horizontal (left and right) directions, respectively. An on-board processor 205 (FIG. 8) can be used to analyze the overall angle of the control arm 2 and determine the maximum allowable acceleration and travel speed, and then relay the information to the motor controller 203 to establish the acceptable acceleration, deceleration, braking and travel speed. The control arm angle data may be constantly monitored by the control arm angle sensor 201 and steering angle sensor 202 and the on-board processor 205, so that the acceleration and travel speed of the pallet truck 20 may be automatically adjusted as the operator moves the control arm 2 during normal operation of the pallet truck 20. A minimum allowable acceleration and travel speed occurs with the control arm 2 located in the extreme left or extreme right steering position while at the same time being positioned in the near vertical or near horizontal non-braking position. The maximum allowable acceleration and travel speed occurs with the control arm 2 located approximately about the center position between left and right steering and at an approximate center position between vertical and horizontal position. Variable allowable acceleration and travel speeds occur when the control arm 2 is located in a position outside of the maximum and minimum acceleration positions described directly above. In the preferred embodiment, the acceleration of the pallet truck 20 will be set to zero if the control arm 2 is located in either the vertical or horizontal position.

The steering angle sensor 202 (FIG. 3) may also be used to determine the amount of force being applied by the operator to the steer control handle 13, and when this force exceeds a specified threshold value, a power assist system will signal a steer motor 207 (FIG. 3) to provide additional torque to turn the drive wheel 15. The permissible torque provided by the steer motor 15 may be specified differently depending on the position of the control arm 2, and as determined by the on-board processor 205.

When the control arm angle sensor 201 and steering angle sensor 202 provide the on-board processor 205 with the position of the control arm 2, the on-board processor 205 is able to compute the allowable level of performance of the traction motor 6, as well as the permissible torque assistance provided by the power assist steering system. This may be accomplished by means of a mathematical calculation or algorithm, or according to predefined values found in mapped data. Moving the control arm 2 in either vertical or horizontal axis independently, or moving the control arm 2 in both axes concurrently, will cause the allowable acceleration, deceleration, braking, travel speed, and steering control of the pallet truck 20 to vary according to the commands of the on-board processor 205.

Figure 4:
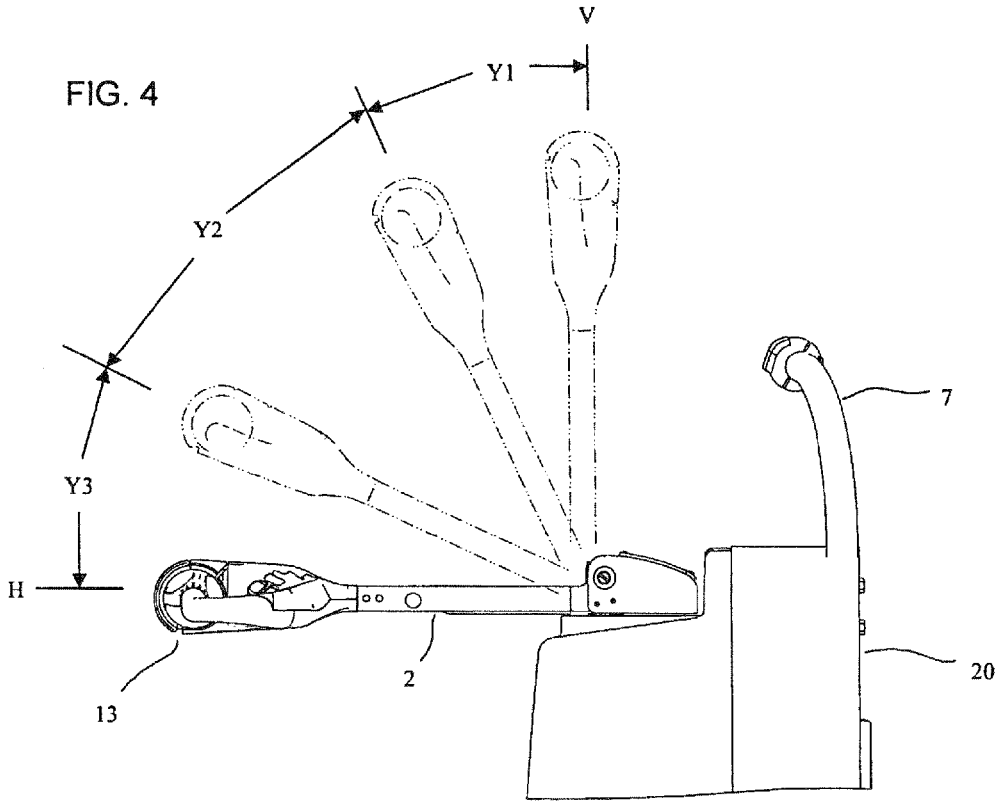
FIG. 4 is a side view of the control arm, depicting five different ranges of vertical motion.
Figure 5:
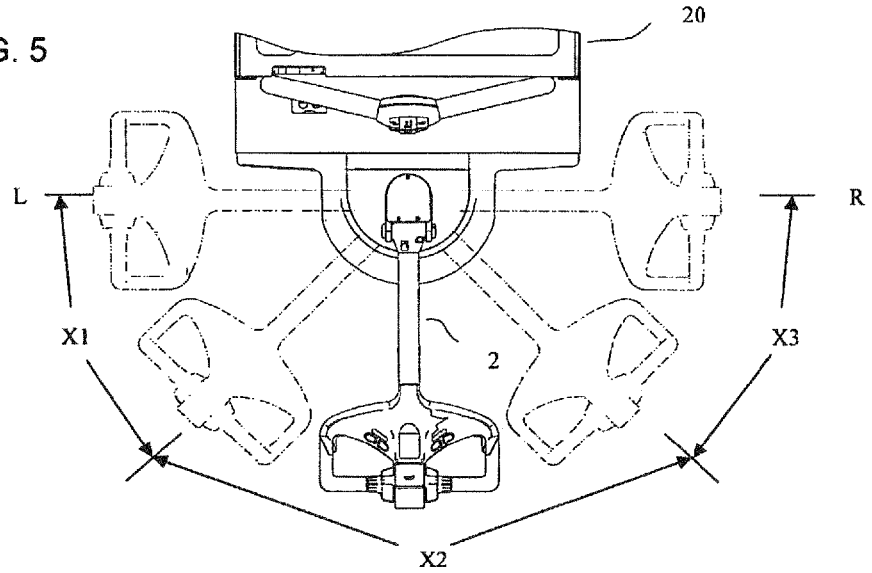
FIG. 5 is a top view of the control arm, depicting five different ranges of horizontal motion.

The control arm 2 can be pivoted about a horizontal axis as shown in FIG. 4 as well as a vertical axis as shown in FIG. 5, or may be pivoted about both axes simultaneously providing for a virtually infinite number of positions in an approximate quarter-sphere operating range. FIG. 4 shows five distinct ranges of vertical movement of the control arm 2, defined as V, Y1, Y2, Y3, and H, which determines the acceleration, deceleration, braking, and travel speed, for the pallet truck 20 for a given horizontal position of the control arm 2. The pallet truck 20 is caused to brake when the control arm 2 is in an approximate vertical position V and approximate horizontal position H. The term approximate as used in the preceding sentence, could be understood to provide a tolerance of 3 to 5 degrees from the vertical or horizontal position, for example. FIG. 5 shows five discrete ranges of horizontal movement of the control arm 2, defined as L, X1, X2, X3, and R, which determines the acceleration, deceleration, braking, and travel speed of the pallet truck 20 for a given vertical position of the control arm 2. Acceleration and travel speeds of the pallet truck 20 are greater when the control arm 2 is in range Y2 or X2, and is at the maximum rate when the position of the control arm 2 lies within ranges Y2 and X2 simultaneously.

Figure 6:
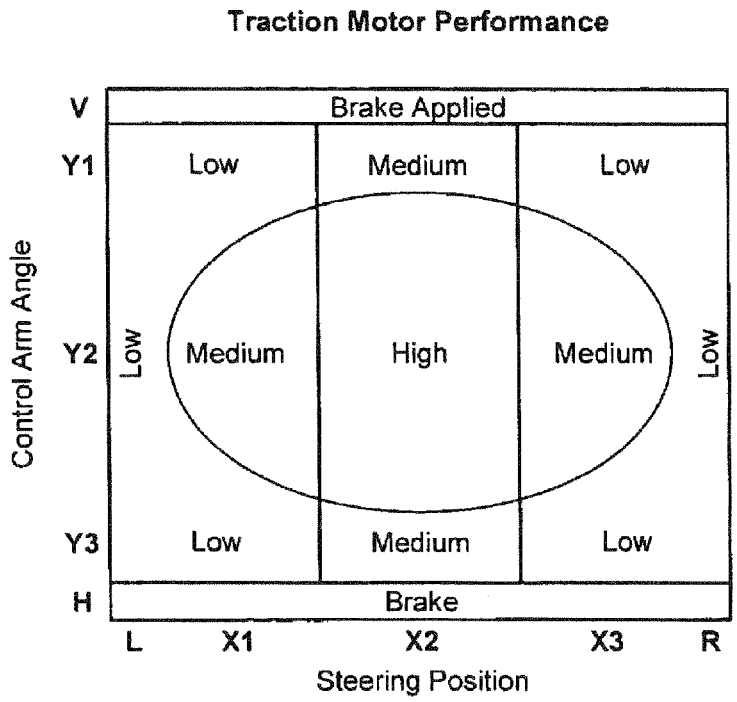
FIG. 6 is a data map depicting the pallet truck acceleration, deceleration, braking, and travel speed as a function of control arm angle in the horizontal and vertical axes.

A determination of acceleration and travel speed as a function of the position of the control arm 2 about each axis is represented graphically in FIG. 6, whereby the horizontal movement of the control arm 2 is represented by the horizontal x-axis of the chart labeled "Steering Position", and the vertical movement of the control arm 2 is represented by the vertical y-axis of the chart, labeled "Control Arm Angle". The on-board processor 205 compares the vertical and horizontal position of the control arm 2, and determines the allowable acceleration, deceleration, braking, and travel speed of the pallet truck 20 according to a predetermined data map 206, similar to that shown in FIG. 6. The "high" acceleration and travel speed, in this case, corresponds with the maximum allowable acceleration and travel speed of the low speed travel mode.

Figure 7:
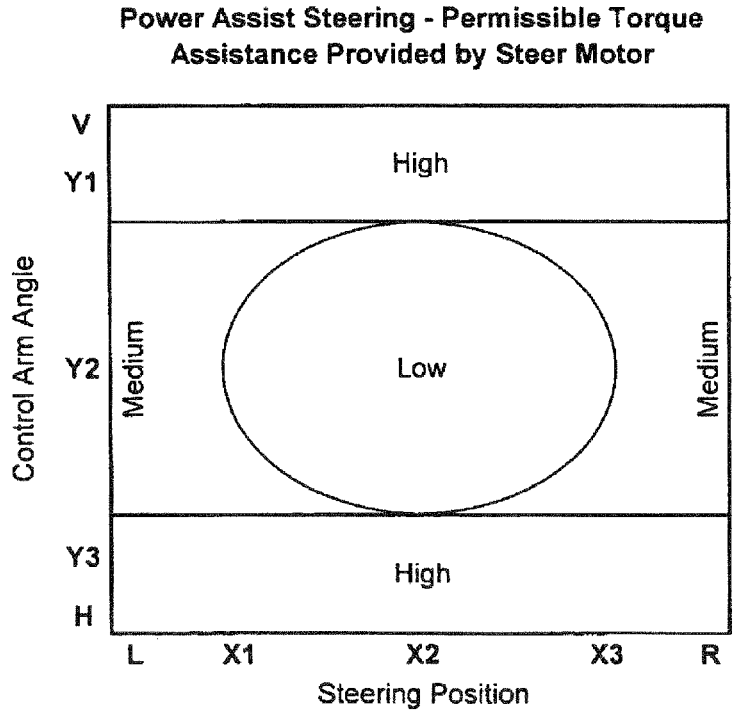
FIG. 7 is a data map depicting the permissible torque assistance for power steering as a function of control arm angle in the horizontal and vertical axes.

A determination of the permissible torque assistance provided by the power assist steering system as a function of the position of the control arm 2 about each axis is represented graphically in FIG. 7, whereby the horizontal movement of the control arm 2 is represented by the horizontal x-axis of the chart labeled "Steering Position", and the vertical movement of the control arm 2 is represented by the vertical y-axis of the chart labeled "Control Arm Angle". The on-board processor 205 compares the vertical and horizontal position of the control arm 2, and determines the permissible torque assistance provided by the power assist steering system according to a predetermined data map 206, similar to that shown in FIG. 7. The "high" permissible torque assistance, in this case, corresponds with a maximum, or high, torque provided by the steer motor 207 when a threshold level of torque is applied to the steer handle 13. The "low" threshold value, in this case, corresponds with a minimum, or low, torque provided by the steer motor 207 when a threshold level of torque is applied to the steer handle 13. A "high" permissible torque assistance value, therefore, provides the operator with the greatest level of steering assistance.

The various combinations of steering position and control arm angle of the control arm 2 will now be described in relation to the acceleration, deceleration, braking, and travel speed of the pallet truck 20, with reference to the preferred embodiment and example travel modes as shown in FIG. 4, FIG. 5 and the data map shown in FIG. 6. With the control arm 2 located at the approximate center in both the horizontal (x axis) and vertical (y axis) positions, the data map 206 would specify a maximum allowable acceleration and travel speed of the pallet truck 20 within the current travel mode, low or high. As the control arm 2 is turned to the left or right, it next passes into steering positions X1 and X3 (FIG. 5). Within these steering positions, and provided the control arm 2 still lies in the control arm angle shown as Y2 (FIG. 4), the data map 206 would specify a "medium" or intermediate acceleration and travel speed. If the pallet truck 20 is in the high speed travel mode at the time the angle of the control arm 2 enters steering positions X1 or X3, the on-board processor 205 would disengage the high speed travel mode and cause the pallet truck 20 to enter the low speed travel mode. As the control arm 2 approaches the approximate maximum left position L or approximate maximum right position R, the data map 206 would specify the "low" or minimum acceleration and travel speed. The pallet truck 20 would be restricted to this low acceleration and travel speed anytime the control arm 2 is located approximately at the L or R position, and regardless of the position of the control arm 2 in the vertical direction. Similarly, the on-board processor 205 engages the low speed travel mode any time that the control arm 2 is located approximately at the L or R positions. Low, medium and high traction system performance can be set differently depending on the application, and in a typical pallet truck application could be set as 25%, 60% and 100% of available traction system performance, respectively.

With the control arm 2 in the Y1 or Y3 control arm angle, the pallet truck 20 would be restricted to a low acceleration and travel speed when the control arm 2 is in the X1 or X3 steering positions, and would be restricted to an intermediate acceleration and travel speed when the control arm 2 is in the X2 steering position. Regardless of the steering position of the control arm 2, the on-board processor 205 would cause the pallet truck 20 to brake anytime the control arm angel of the control arm 2 was at the approximate positions of V or H. The system thus described should not be considered incompatible with a "creep speed" function whereby the operator is able to over-ride the braking condition of the pallet truck 20 with the control arm 2 in a vertical position, and instead cause the pallet truck 2 to move in a low, or creep, speed. The preferred embodiment of this invention would provide for such a creep speed function to enable the pallet truck 20 to maneuver in small confines at a controlled low rate of travel, when the control arm 2 is located in an approximate vertical position.

The various combinations of steering angle and control arm angle of the control arm 2 will now be described in relation to the permissible torque assistance provided by the power assist steering system, with reference to the preferred embodiment and example travel modes as shown in FIG. 4, FIG. 5 and the data map shown in FIG. 7. With the control arm 2 located at the approximate center in both the horizontal (x axis) and vertical (y axis) positions, the data map 206 would specify a low permissible torque assistance provided by the power assist steering system. As the control arm 2 is turned to the left or right, it next passes into steering positions X1 and X3 (FIG. 5), and ultimately to positions L and R. Within these approximate steering positions, and assuming the control arm 2 lies in the control arm angle Y2 (FIG. 4), the data map 206 would specify a low to medium permissible torque assistance provided by the power assist steering system.

With the control arm 2 in the approximate control arm angles Y1 and Y3 or positions V and H, the permissible torque assistance provided by the power assist steering system, would be set at the high value regardless of the steering position of the control arm 2 about the vertical axis. Torque assistance can be made a function of the pallet truck 20 travel speed, or low or high speed travel modes, which could result in a variable torque assistance. In the preferred embodiment, activation of the steer motor 207 to provide power assisted steering would not be deactivated when the control arm 2 is approximately located in the control arm angles shown as V and H in FIG. 4.

Acceleration, deceleration, braking, travel speeds, and torque assistance can vary from low to medium to high, or other predetermined values and infinitely variable rates by the pallet truck manufacturer depending on customer application and requirements. Similarly, the on-board processor 205 can set the acceleration, deceleration, braking, travel speeds, and torque assistance according to different vertical and horizontal positions of the control arm 2, and to multiple or infinitely variable ranges. Low, medium and high levels of power assisted steering can be set differently depending on the application, and in a typical pallet truck application could be set as 30%, 70% and 100% of available torque capacity, respectively.

Acceleration, deceleration, braking, travel speed, and torque assistance can be made to vary depending on the rate of change of position of the control arm 2. For example, the control arm angle sensor 201 and the steering angle sensor 202 can be made to determine the angular rate of change in position of the control arm 2 in the vertical and horizontal directions, respectively. In one embodiment of the invention, if the operator moves the control arm 2 in rapid motion towards the approximate horizontal or approximate vertical positions, the acceleration, deceleration, braking, travel speed, and torque assistance commands that would otherwise be sent by the on-board processor 205 as a function of the position of the control arm 2 may be overridden such that the pallet truck is caused to decelerate, brake, or have a lower maximum allowable acceleration or travel speed. Similarly, if the control arm 2 is maneuvered quickly to the extreme left or right positions, the on-board processor 205 could interpret this as the operator attempting to avoid an obstacle, in which case the on-board processor 205 may be programmed to send a braking command. According to these examples, the on-board processor 205 is seeking to anticipate the intention of the operator with respect to the operator commands, position of the control arm 2, and rate of change of position of the control arm 2. Rate of change of the control arm 2 can be evaluated by the on-board processor according to input from the control arm angle sensor 201 and steering angle sensor 202 individually or jointly. In addition, evaluation of the rate of change of position of the control arm 2 can be made a function of the pallet truck 20 travel speed, or low or high speed travel modes, which could result in variable acceleration, deceleration, braking, travel speed, and torque assistance commands being sent by the on-board processor 205.

Figure 3:
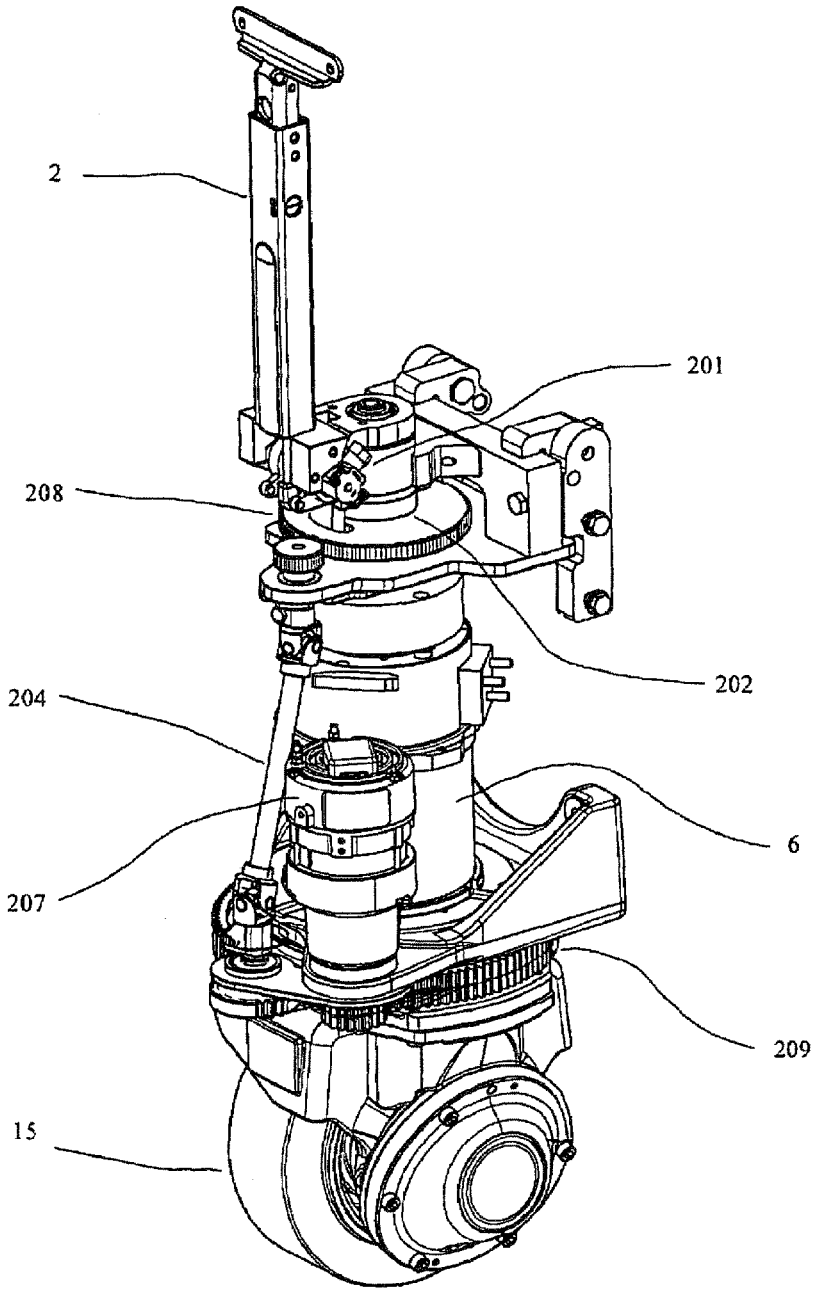
FIG. 3 is a perspective view of the steering control unit.

The steer control unit 50 is shown in greater detail in FIG. 3, which depicts the mechanical linkage and relative position of the control arm 2, control arm angle sensor 201, steering angle sensor 202, and the drive wheel 15. As the control arm 2 is pivoted in either the horizontal or vertical axis, or a combination of both, the control arm angle sensor 201 and steering angle sensor 202 provide constant input to the on-board processor 205 (FIG. 8) which actively controls the performance of the traction motor 6 and steer motor 207 by means of a motor controller 203. There would typically be a different motor controller 203, for each of the traction motor 6 and the steer motor 207. As the control arm 2 is rotated about the vertical axis, upper steering input gears 208 engage the mechanical connection 204 which causes the drive wheel 15 to rotate about a vertical axis. If the steering angle sensor 202 detects a threshold torque is being applied to the control arm 2, the on-board processor 205 will send a signal to the motor controller 203 to actuate the steer motor 207, which in turn assists in causing the rotation of the drive wheel 15 to about a vertical axis by means of the lower steering gears 209. The rotation of the drive wheel 15 about its vertical axis results in steering of the motorized pallet truck 20.

Disconnecting a battery 212 (FIG. 8), turning off an ignition 210 (FIG. 8), or activating a brake switch 211 (FIG. 8), will disable the traction motor 6, in any of the travel modes or operating states discussed. In this case, position of the control arm 2 is ignored by the on-board processor 205 until such time that the traction motor 6 is again enabled, and the throttle 107 is activated.

Figure 2:
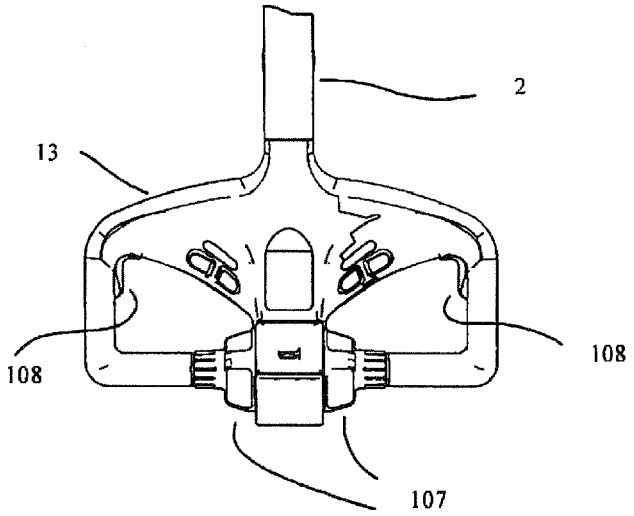
FIG. 2 is a top view of the control arm steer handle.

The steer control handle 13 includes two symmetrical throttle 107 and two symmetrical pick buttons 108, as shown in FIG. 2. Operation of the throttle 107 has been described above. Operation of an example pick button 108 is described in patent application "METHOD AND APPARATUS FOR CONTROLLING MOTORIZED VEHICLE TRAVEL IN A PICK STATE" as submitted by NMHG in March 2005. Whereas the throttle 107 provides for variable acceleration and travel speeds within the predefined maximum allowable range, according to the position of the control arm 2 and according to the degree the throttle 107 is rotated, the pick button 108 acts to accelerate the traction motor 6 in a binary condition, either on or off. Operation of the pick button 108 will provide for a maximum acceleration and travel speed of the pallet truck 20 as determined by the angle of the control arm 2 in the vertical and horizontal position. Therefore, pressing the pick button 108 will cause the pallet truck to accelerate at the maximum value according to the position of control arm 2 and the acceleration command provided by the on-board processor 205.

Acceleration, deceleration, braking, travel speeds and torque assistance may be set differently by the on-board processor 205 when the operator presses the high speed button 4, and causes the pallet truck 20 to enter a high speed travel mode. In the preferred embodiment of the invention, the high speed button 4 may only be activated if the control arm 2 lies in a position within both ranges Y2 and X2, as shown in FIG. 4 and FIG. 5, simultaneously. If the control arm 2 lies outside of this area, than the high speed button 4 may not be activated. In an alternate embodiment of the invention, a reduced intermediate acceleration and travel speed within the high speed travel range will be possible if the control arm 2 lies with range X2 and either of the ranges Y1 or Y3. This intermediate acceleration and travel speed within the high speed travel range would be higher than the maximum allowable acceleration and travel speed within the low speed travel range, for example. With the control arm 2 located in ranges X1 or X3, it is desirable that acceleration and travel speeds should not exceed those defined for the low speed travel mode, and the high speed mode would be deactivated.

The state diagram shown in FIG. 8 provides an overview of the traction and steer system functionality. The on-board processor 205 continuously monitors input from the throttle 107, high speed button 4, steering position sensor 202, and control arm angle sensor 201. Where a pick button 108 (FIG. 2) is included on the pallet truck, this is also monitored by the on-board processor 205, consistent with the input from the throttle 107. The input to the on-board processor 205 constitutes the operator command and serves as a request for performance from the traction system, steering system, and/or braking system. High speed button 4 provides a request for increased performance of the traction motor 6, depending on the position of the throttle 107. The control arm angle sensor 201 provides the vertical position of the control arm 2. The steering position sensor 202 provides the horizontal position of the control arm 2, and also the rate of change of position of the control arm 2. One or more steering position sensors 202 may be used to provide the position and rate of change of position of the control arm. The on-board processor 205 evaluates the operator command and references a programmable data map 206 to determine any predetermined performance values for the traction motor 6 and steering motor 207. The on-board processor 205 continuously monitors the ignition switch 210, brake switch 211, and battery switch 212, independently from the operator command to determine if the operator command should be overridden or modified according to the state of the pallet truck 20. Assuming the ignition switch 210, brake switch 211, and battery switch 212 indicate full operation of the pallet truck 20, the on-board processor 20 will send a command to a motor controller 203 according to the predetermined performance values provided by the data map 206. The motor controller 203 then actuates the traction motor 6 and/or the steer motor 207 depending on the operator command. There is typically a separate motor controller 203 for each motor. When the ignition switch 210, brake switch 211, or battery switch 212 indicate that an ignition off, braking, or battery disconnect condition exists, the on-board processor 205 will override the request for actuation of the traction motor 6. The existence of these intermediate conditions will not necessarily override a request for activation of the steer motor 207, except where there is no available power to actuate the steer motor 207.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control; and adjusting the level of performance of the traction system as the steering control is rotated between a first steering angle and a second steering angle, wherein the level of performance of the traction system indicates a maximum allowable travel speed of the motorized vehicle.

2. A method for controlling a motorized vehicle, comprising:

measuring a steering angle of a steering control, wherein the steering angle is determined according to a rotation of the steering control about an approximately vertical axis of rotation;

measuring a braking position of the steering control, wherein the braking position is determined according to a rotation of the steering control about an approximately horizontal axis of rotation;

setting a level of performance of a traction system as a function of the steering angle of the steering control; and adjusting the level of performance of the traction system, as the steering control is rotated between a first steering angle and a second steering angle, according to both the steering angle and the braking position of the steering control.

3. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control; and adjusting the level of performance of the traction system as the steering control is rotated between a first steering angle and a second steering angle, wherein the level of performance of the traction system decreases when the steering control approaches a maximum turning angle.

4. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control; and adjusting the level of performance of the traction system as the steering control is rotated between a first steering angle and a second steering angle, wherein the level of performance of the traction system is adjusted by an on-board processor based on a position of the steering control.

5. The method according to claim 4 including accessing a data map to set the level of performance of the traction system according to predetermined values in the data map that correspond to the position of the steering control.

6. The method according to claim 1 wherein the level of performance of the traction system further indicates a level of vehicle acceleration.

7. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control;

adjusting the level of performance of the traction system as the steering control is rotated between a first steering angle and a second steering angle; and dividing the steering angle into predefined discrete ranges of motion about the vertical axis of rotation, wherein the level of performance of the traction system is set according to [the] where the steering control is located within the predefined discrete ranges of motion.

8. The method according to claim 7 wherein the steering angle is divided into three or more predefined discrete ranges of motion.

9. The method according to claim 2 including identifying the braking position as predefined discrete ranges of motion about the horizontal axis of rotation, wherein the level of performance of the traction system is set according to where the steering control is located within the predefined discrete ranges of motion about both the approximately vertical and horizontal axes of rotation.

10. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control; and adjusting the level of performance of the traction system as a function of a rate of change of position of the steering control as the steering control is rotated between a first steering angle and a second steering angle, wherein the rate of change of position identifies an angular acceleration of the steering control about the approximately vertical axis of rotation.

11. The method according to claim 10 wherein the rate of change of position further identifies an angular acceleration of the steering control about an approximately horizontal axis of rotation.

12. The method according to claim 10 including accessing a data map to set the level of performance according to predetermined settings based on a discrete position of the steering control and the rate of change of position of the steering control.

13. The method according to claim 10 including further setting the level of performance of the traction system as a function of a rate of travel of the motorized vehicle.

14. A method for controlling a motorized vehicle, comprising:

measuring a position of a steering control, wherein the position is determined according to a rotation of the steering control about one or more axes of rotation;

detecting a steer effort applied to the steering control;

selecting a level of power assistance provided by a steering motor, wherein the steering motor is configured to provide a plurality of levels of power assistance greater than zero power, and wherein the level of power assistance is selected from the plurality of levels as a function of the position of the steering control; and actuating the steering motor when the detected steer effort is greater than a threshold torque value.

15. The method according to claim 14 wherein the position of the steering control is measured about a horizontal axis of rotation.

16. The method according to claim 14 wherein the position of the steering control is measured about a vertical axis of rotation.

17. The method according to claim 16 wherein the steering motor is set to a first level of power assistance with the steering control positioned in an approximate center position, and wherein the steering motor is set to a second level of power assistance when the steering control is positioned in a maximum left or right steering position, the second level of power assistance greater than the first level of power assistance.

18. The method according to claim 15 wherein the steering motor is set to a first level of power assistance with the steering control positioned in an approximate center position, and wherein the steering motor is set to a second level of power assistance with the steering control positioned in a braking position, the second level of power assistance greater than the first level of power assistance.

19. The method according to claim 18 wherein the braking position is identified by a substantially vertical position of the steering control.

20. The method according to claim 16 including dividing the rotation of the steering control into predefined discrete ranges of motion about the vertical axis of rotation, wherein the level of power assistance is selected according to where the steering control is located within the predefined discrete ranges of motion.

21. The method according to claim 20 wherein the rotation of the steering control is divided into three or more predefined discrete ranges of motion.

22. The method according to claim 14 including dividing the rotation of the steering control into predefined discrete ranges of motion about the one or more axes of rotation, wherein the level of power assistance of the steering motor is further selected according to where the steering control is located within the predefined discrete ranges of motion.

23. The method according to claim 14 wherein the level of power assistance of the steering motor varies depending if the motorized vehicle is traveling in a low speed mode or a high speed mode.

24. A system for controlling a pallet truck, comprising:

a control arm configured to steer a drive wheel that controls a direction of travel of the pallet truck;

a steer motor configured to provide torque for steering the drive wheel; and a processor configured to vary an amount of the torque provided by the steer motor according to a rate of change of position of the control arm with respect to time, wherein the rate of change of position of the control arm is monitored in one or both of a vertical direction of movement and a horizontal direction of movement.

25. A system for controlling a pallet truck, comprising:

a control arm configured to steer a drive wheel that controls a direction of travel of the pallet truck;

a steer motor configured to provide torque for steering the drive wheel; and a processor configured to vary an amount of the torque provided by the steer motor according to a rate of change of position of the control arm with respect to time, wherein the processor further varies the amount of torque provided by the steer motor to assist in steering the [steer] *drive* wheel according to an amount of torque applied to the control arm.

26. A method for controlling a motorized vehicle, comprising:

measuring a position of a steering controller, wherein the position is determined according to a rotation of the steering controller about an approximately vertical axis of rotation and about an approximately horizontal axis of rotation;

measuring a rate of change of position of the steering controller; and controlling acceleration, deceleration, braking, and travel speed of the motorized vehicle according to the position of the steering controller in conjunction with the rate of change of position of the steering controller.

27. A method for controlling a motorized vehicle, comprising:

measuring a steering angle of a steering control, wherein the steering angle is determined according to a rotation of the steering control about an approximately vertical axis of rotation;

setting a level of performance of a traction system as a function of the steering angle of the steering control; and adjusting the level of performance of the traction system as the steering control is rotated between a first steering angle and a second steering angle, wherein the level of performance of the traction system is further selected as a function of a rate of travel of the motorized vehicle.

28. The method according to claim 14 wherein the level of power assistance provided by the steering motor is further selected from the plurality of levels of power assistance as a function of the detected steer effort.

29. The method according to claim 14 wherein the level of power assistance provided by the steering motor is further selected as a function of a rate of travel of the motorized vehicle.

30. The method according to claim 23 wherein the level of power assistance of the steering motor varies for the same steer effort applied to the steering control.

31. The method according to claim 1 wherein the traction system comprises a traction motor, and wherein the level of performance of the traction motor is adjusted as the steering control is rotated between the first steering angle and the second steering angle.

*32. The method of claim 1, wherein setting the level of performance of the traction system comprises setting a level of vehicle acceleration, and wherein adjusting the level of performance of the traction system comprises adjusting the level of vehicle acceleration as the steering control is rotated between the first steering angle and the second steering angle.*

*33. The method of claim 2, wherein the level of performance of the traction system is further adjusted according to a rate of rotation of the steering control between the first steering angle and the second steering angle.*

*34. The method of claim 3, wherein setting the level of performance of the traction system comprises setting an allowable vehicle acceleration, and wherein adjusting the level of performance of the traction system comprises adjusting the allowable vehicle acceleration.*

*35. The method of claim 4, wherein the level of performance of the traction system is adjusted according to a rate of rotation of the steering control between the first steering angle and the second steering angle.*

*36. A system, comprising:*

*a control arm configured to steer a vehicle;*

*a steering detector configured to measure a steering angle of the control arm, wherein measuring the steering angle comprises detecting a rate of change in position of the control arm with respect to time from a first steering angle to a second steering angle about an approximately vertical axis of rotation;*

*a throttle configured to generate a speed request as a function of the steering angle, wherein a maximum allowable travel speed of a vehicle traction system is associated with the speed request; and*

*a processor configured to reduce the maximum allowable travel speed of the vehicle traction system based, at least in part, on the rate of change in position of the control arm with respect to time from the first steering angle to the second steering angle, wherein the rate of change in position of the control arm identifies an angular acceleration of the control arm about the approximately vertical axis of rotation.*

*37. The system according to claim 36 wherein the processor is further configured to modify the speed request based, at least in part, on the rate of change in position of the control arm.*

*38. The system according to claim 36 wherein the steering detector is further configured to detect a change in position of the control arm comprising angle data associated with the position of the control arm in the horizontal direction, and wherein the maximum allowable travel speed is reduced based, at least in part, on a detected change in the angle data.*

*39. The system according to claim 38, wherein the processor is further configured to determine the maximum allowable travel speed based, at least in part, on the angle data.*

*40. The system of claim 36, wherein the processor is further configured to reduce a maximum allowable vehicle acceleration based, at least in part, on the rate of change in position of the control arm from the first steering angle to the second steering angle.*

*41. A system, comprising:*

*a control arm configured to steer a vehicle;*

*a steering detector configured to measure a position of the control arm according to a rotation of the control arm about an approximately vertical axis of rotation and about an approximately horizontal axis of rotation, wherein the steering detector is further configured to measure a rate of change in position of the control arm with respect to time, wherein the change in position of the control arm comprises a first steering position and a second steering position;*

*a throttle configured to generate a speed request associated with a traction system; and*

*a processor configured to reduce the speed request associated with the traction system based, at least in part, on the position of the control arm in conjunction with the rate of change in position of the control arm with respect to time when the control arm is moved from the first steering position to the second steering position.*

*42. The system according to claim 41 wherein the first steering position comprises a central position of the control arm, and wherein the second steering position is associated with a maximum turning angle of the vehicle.*

*43. The system according to claim 41 wherein a maximum allowable travel speed is associated with the speed request, and wherein the processor is further configured to modify*

*the maximum allowable travel speed based on the rate of change in position of the control arm.*

*44. The system according to claim 41 wherein the steering detector is further configured to detect a change in position of the control arm comprising angle data associated with the first steering position and the second steering position, and wherein the speed request is reduced based, at least in part, on a detected change in the angle data.*

*45. The system of claim 41, wherein the steering detector is further configured to detect a rate of change in the position of the control arm with respect to time in a vertical direction, and wherein the processor is further configured to reduce the speed request associated with the traction system based, at least in part, on the rate of change in the position of the control arm in the vertical direction.*

*46. The system of claim 41, wherein the processor is further configured to reduce the speed request associated with the traction system based, at least in part, on the rate of change in the position of the control arm when the control arm is moved from the first steering position to the second steering position.*

*47. The system of claim 41, wherein the rate of change in position of the control arm identifies an angular acceleration of the control arm about the approximately vertical axis of rotation.*

*48. An apparatus, comprising:*

*means for detecting a change in position of a steering control about an axis of rotation, wherein the change in position comprises a first position of the steering control and a second position of the steering control;*

*means for detecting a steer effort applied to the steering control;*

*means for selecting a level of power assistance provided by a steering motor, wherein the steering motor is configured to provide a plurality of levels of power assistance greater than zero power, wherein the level of power assistance is selected from the plurality of levels as a function of the position of the steering control, and wherein the selected level of power assistance associated with the second position is greater than the selected level of power assistance associated with the first position for a same amount of detected steer effort; and*

*means for actuating the steering motor when the detected steer effort is greater than a threshold torque value.*

*49. The apparatus according to claim 48 wherein the change in position further comprises an approximately vertical rotation of the steering control about the axis of rotation toward a braking position.*

*50. An apparatus, comprising:*

*means for detecting a change in position of a steering control about an axis of rotation, wherein the change in position comprises an approximately vertical rotation of the steering control about the axis of rotation toward a braking position;*

*means for detecting a steer effort applied to the steering control;*

*means for selecting a level of power assistance provided by a steering motor, wherein the steering motor is configured to provide a plurality of levels of power assistance greater than zero power, and wherein the level of power assistance is selected from the plurality of levels as a function of the position of the steering control; and*

*means for actuating the steering motor when the detected steer effort is greater than a threshold torque value.*

*51. The apparatus according to claim 50 wherein the level of power assistance increases as the steering control approaches the braking position.*

*52. The apparatus according to claim 51 wherein the braking position is associated with an approximately vertical orientation of the steering control.*

* * * * *